United States Patent
Nagai et al.

(10) Patent No.: US 6,296,081 B1
(45) Date of Patent: Oct. 2, 2001

(54) LIFT CYLINDER AND MAST ASSEMBLY OF FORKLIFT

(75) Inventors: Katsumi Nagai; Takaki Ogawa; Yasuhiko Naruse, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/287,835

(22) Filed: Apr. 7, 1999

(30) Foreign Application Priority Data

Apr. 10, 1998 (JP) .................................................. 10-098999

(51) Int. Cl.$^7$ ........................................................ B66B 3/00
(52) U.S. Cl. ........................ 187/394; 187/274; 187/224; 414/635
(58) Field of Search .................................. 187/374, 285, 187/222, 224, 233, 234, 274; 280/707; 92/5 R; 414/630, 631, 633, 635, 636, 701, 266; 367/95, 99, 118; 324/635, 644

(56) References Cited

U.S. PATENT DOCUMENTS

| | | | |
|---|---|---|---|
| 4,084,149 | * | 4/1978 | Driver et al. ............................ 49/31 |
| 4,327,427 | * | 4/1982 | Hotta et al. ........................... 367/118 |
| 4,542,652 | | 9/1985 | Reuter et al. . |
| 4,543,649 | * | 9/1985 | Head et al. ............................. 367/96 |
| 4,881,604 | * | 11/1989 | Orthwein ................................ 173/11 |
| 4,995,635 | * | 2/1991 | Guy ...................................... 280/707 |
| 5,104,144 | * | 4/1992 | Bethell ................................ 280/707 |
| 5,150,049 | * | 9/1992 | Schutz ............................. 324/207.12 |
| 5,328,321 | * | 7/1994 | Moffett et al. ....................... 414/631 |
| 5,749,696 | * | 5/1998 | Johnson ............................... 414/635 |
| 5,977,778 | * | 11/1999 | Chan et al. ........................... 324/635 |
| 6,119,579 | * | 9/2000 | Pawelski ............................... 92/5 R |

FOREIGN PATENT DOCUMENTS

| | | |
|---|---|---|
| 59-4599 | 1/1984 | (JP) . |
| 6-24699 | 2/1994 | (JP) . |
| 7-2496 | 1/1995 | (JP) . |
| 7-30635 | 7/1995 | (JP) . |
| 10-17291 | 1/1998 | (JP) . |

OTHER PUBLICATIONS

Patent Abstracts of Japan Publication No. 10017291, published Jan. 20, 1998.

* cited by examiner

Primary Examiner—Jonathan Salata
(74) Attorney, Agent, or Firm—Morgan & Finnegan, LLP (57) ABSTRACT

An ultrasonic sensor detects whether a piston is at the lowest position. The sensor is not affected by the environment or damaged by contact with other objects. The sensor is located in the bottom of a mast cylinder, transmits ultrasonic waves to the bottom of a piston and receives ultrasonic waves reflected by the piston. The sensor then outputs electric signals based on the received ultrasonic waves. The ultrasonic sensor is electrically connected to a transmitter-receiver, which, in turn, is electrically connected to a controller. The transmitter-receiver includes an ultrasonic wave generator and sends ultrasonic wave transmitting signal having a predetermined frequency to the ultrasonic sensor based on control signals from the controller. The controller measures time from when it outputs the ultrasonic wave transmitting signal to when the sensor receives a reflected wave. The controller then compares the measured time with a threshold value thereby judging whether the piston is at the lowest position.

8 Claims, 5 Drawing Sheets

LIFT CYLINDER AND MAST ASSEMBLY OF FORKLIFT

BACKGROUND OF THE INVENTION

The present invention relates to a lift cylinder and a mast assembly of forklifts.

A typical forklift has lift cylinders for lifting and lowering a fork, which is supported by a mast assembly. There are several types of mast assemblies. In one type of mast assembly, a fork is lifted and lowered together with inner masts. There is also a full free type mast assembly, which includes a full free cylinder and mast cylinders. The full free cylinder lifts and lowers the fork without moving inner masts, while the mast cylinders lift and lower the inner masts.

The mast cylinders extend and retract the mast assembly, and the full free cylinder lifts and lowers a lift bracket, to which the fork is secured, relative to the inner mast. When lifting the fork, the mast cylinders start extending the mast assembly after the full free cylinder reaches its maximum length. When lowering the fork, the full free cylinder starts retracting after the mast cylinders retract to the minimum length.

In a typical forklift, an operator manipulates a height control lever to lift a fork to a certain height. In addition to the height control lever, some forklifts (for example, one described in Japanese Unexamined Patent Publication No. 7-2496) are equipped with an automatic lifting apparatus for lifting the fork. The operator touches a control panel to actuating the automatic lifting apparatus, which, in turn, automatically lifts the fork to a desired height. The apparatus includes a controller that controls the lift cylinders. The controller detects the height of the fork based on a signal from a height sensor and stops the lift cylinders when the fork reaches a target height. When a forklift is used indoors, or in a place with a ceiling, careless lifting of the fork may damage the ceiling. To avoid this problem, some forklifts are equipped with a height limiting apparatus. The height limiting apparatus detects the height of the fork and prevents the fork from being lifted beyond a predetermined height.

A typical forklift has a reel type height sensor for continuously detecting the height of the fork. A reel type height sensor includes a wire, one end of which is connected to the fork, a reel, about which the wire is wound, and a potentiometer for detecting a rotation amount of the reel.

The reel increases the size of the height sensor. Also, the wire, which is exposed, can be damaged by contact with foreign objects. Further, dust may cause the potentiometer to malfunction. Accordingly, frequent maintenance of the sensor is required. Especially, when the forklift is used at a place near the sea or in a condition where brine is used, the potentiometer can easily malfunction.

In some forklifts, a rotary encoder is used for detecting the height of a fork instead of a reel type height sensor. In this case, a rack is formed on a mast and a pinion is mounted on the fork to integrally move with the fork. The rotary encoder detects the rotational amount of the pinion, which rotates as the fork is lifted or lowered. The rotary encoder can be an absolute type or an incremented type. An absolute type encoder is costly. On the other hand, an incremented type encoder, which is less costly than an absolute type encoder, requires that a referential position of the fork be accurately detected. If the referential position is set to the highest position of the fork, the fork must be lifted to the highest position every time the forklift starts operating, which wastes energy. Therefore, the referential position is preferably the lowest position of the fork. Accordingly, a sensor for accurately detecting the lowest fork position is needed.

In a typical forklift, an axle for supporting the rear wheels pivots relative to a body frame for stabilizing the body frame. However, under certain conditions, tilting of the axle will destabilize the forklift. To avoid this problem, Japanese Unexamined Patent Publication No. 58-167215 describes a forklift that locks the rear axle under certain circumstances. The mechanism includes a weight detector and a height detector. The weight detector detects whether the load on the fork is greater than a predetermined threshold value and the height detector detects whether the fork height is greater than a predetermined threshold value. The mechanism locks the rear axle against pivoting when the weight of the load on the fork and the height of the forks exceed the threshold values.

In a typical forklift, the mast assembly is tilted when loading or unloading the fork. The maximum speed of tilting is limited based on the fork height and the load weight on the fork.

In a forklift having a full free type mast assembly, setting the referential height of the fork to a height corresponding to the maximum length of the full free cylinder allows the pivoting of the rear axle and the tilting speed of the mast assembly to be easily and effectively controlled. A sensor for detecting the maximum length of the full free cylinder can be mounted on the full free cylinder. However, since the full free cylinder is lifted and lowered integrally with inner masts, the sensor on the full free cylinder must be connected to a controller by long wires. Further, when the inner masts are at the lowest position, the loose wires must be prevented from interfering with other parts. The long wires are a particular concern in a full free type triplex mast assembly, which has inner masts, middle masts and outer masts.

The time at which the full free cylinder reaches its maximum length can be indirectly detected without monitoring changes in the length of the full free cylinder. That is, the maximum length of the full free cylinder can be detected by measuring time from when the mast cylinders start extending.

SUMMARY OF THE INVENTION

Accordingly, it is a first objective of the present invention to provide a lift cylinder for forklifts that is not damaged by contacting other objects, is hardly influenced by the environment and positively detects whether its piston is at the lowest position. A second objective of the present invention is to provide a mast assembly having a height sensor and the lift cylinder according to the first objective. A third objective of the present invention is to provide a full free type mast assembly that indirectly detects the maximum extension of a full free cylinder, requires no long wires, is not damaged by contacting other objects and is hardly influenced by the environment.

To achieve the foregoing and other objectives and in accordance with the purpose of the present invention, a lift cylinder is provided. The lift cylinder includes a cylinder body, a piston, a transducer device and a controller. The piston moves axially in the cylinder body within a limited range of movement. The transducer device is located near one end of the cylinder body out of the range of movement of the piston. In response to an electric signal, the transducer device transmits an ultrasonic signal toward a reflective surface that moves integrally with the piston. The transducer device receives an ultrasonic signal reflected from the reflective surface and produces an electric signal corresponding to the received ultrasonic signal. The controller judges whether the piston is fully retracted based on the electric signals.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A triplex full free type mast assembly according to one embodiment of the present invention will now be described with reference to FIGS. 1 to 6.

Figure 3A:
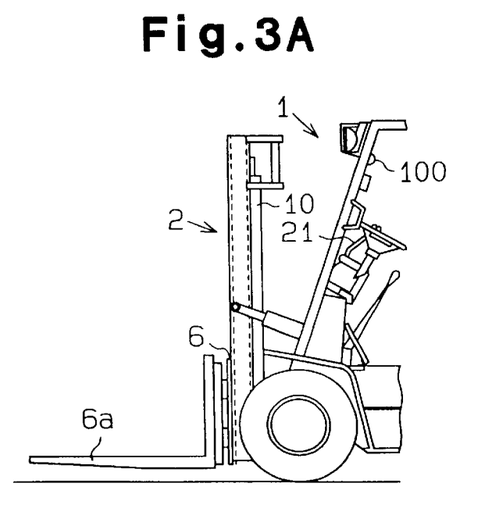
FIG. 3A is a partial side view of a forklift.
Figure 3B:
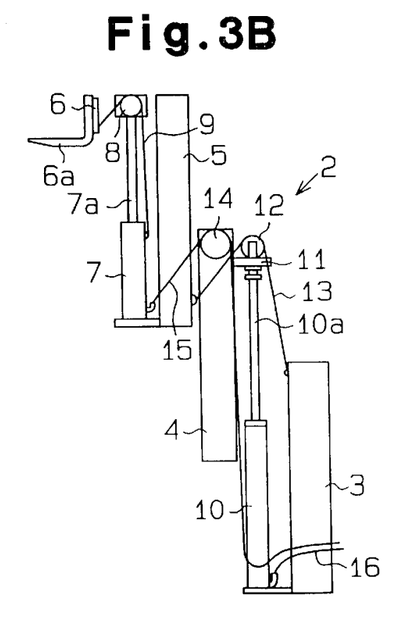
FIG. 3B is a diagrammatic side view illustrating masts in the mast assembly of the forklift shown in FIG. 3A.
Figure 4:
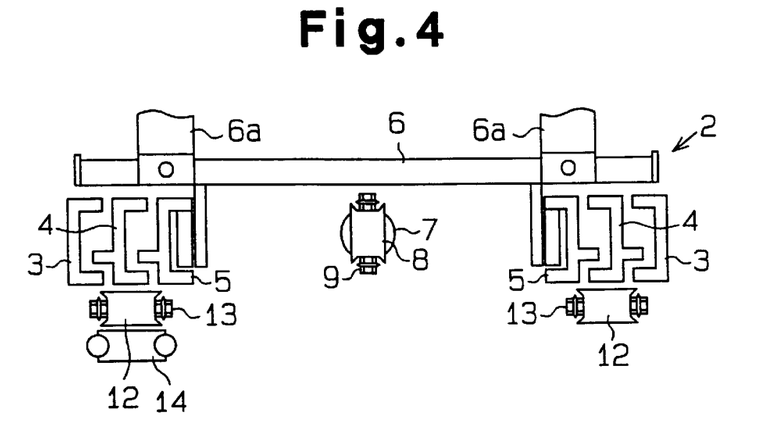
FIG. 4 is a diagrammatic plan view of the mast assembly of FIG. 3A.

As shown in FIG. 3A, a mast assembly 2 is arranged on the front of a forklift 1. As shown in FIGS. 3B and 4, the mast assembly 2 includes a pair of outer masts 3, a pair of middle masts 4 and a pair of inner masts 5. The middle masts 4 are arranged inside of the outer masts 3 and are lifted and lowered relative to the outer masts 3. Likewise, the inner masts 5 are arranged inside of the middle masts 4 and are lifted and lowered relative to the middle masts 4. A lift bracket 6, or lifting implement, having a fork 6a is arranged inside the inner masts 5. The lift bracket 6 is lifted and lowered relative to the inner masts 5. A full free cylinder 7 is located between the inner mast 5 to move integrally with the inner masts 5. The full free cylinder 7 includes a piston rod 7a and a chain wheel 8 supported on the rod 7a. A chain 9 is engaged with the chain wheel 8. A first end of the chain 9 is fixed to the lift bracket 6, while a second end is fixed to the full free cylinder 7. The full free cylinder 7 extends and contracts thereby lifting and lowering the lift bracket 6 along the inner masts 5.

A mast cylinder 10 is arranged behind each middle mast 4. Each mast cylinder 10 has a piston rod 10a. The distal ends of the piston rods 10 are coupled to each other by an upper beam 11. The upper beam 11 couples the piston rods 10 to the upper portion of the middle masts 4. A chain wheel 12 is fixed to the distal end of each piston rod 10a. A chain 13 is engaged with each chain wheel 12. A first end of each chain 13 is fixed to the lower portion of the corresponding inner mast 5, while a second end of the chain 13 is fixed to the top portion of the corresponding outer mast 3. The mast cylinders 10 extend and contract thereby lifting and lowering the middle masts 4 and the inner masts 5. The middle masts 4 are moved by the same distance as the piston rods 10a, while the inner masts 5 are moved by twice the distance that piston rods 10a move.

A pulley 14 is supported on one of the piston rods 10a. The axis of the pulley 14 is aligned with the axis of the chain wheel 12 (as shown in FIG. 4). A hose 15 is engaged with the pulley 14. A first end of the hose 15 is connected to a bottom chamber 7b defined in the full free cylinder 7, while a second end is connected to a sequence valve 17, which will be described later. The masts 3 to 5 are aligned with each other as shown in FIG. 4. However, in FIG. 3B, the masts 3 to 5 are illustrated as if they were displaced from each other to illustrate the positions of the chains 9, 13 and the pulley 12. Further, for visibility, the orientation and the positions of the pulleys 12, 14 are shown in a different manner in FIG. 3B from those in FIG. 4.

Figure 6:
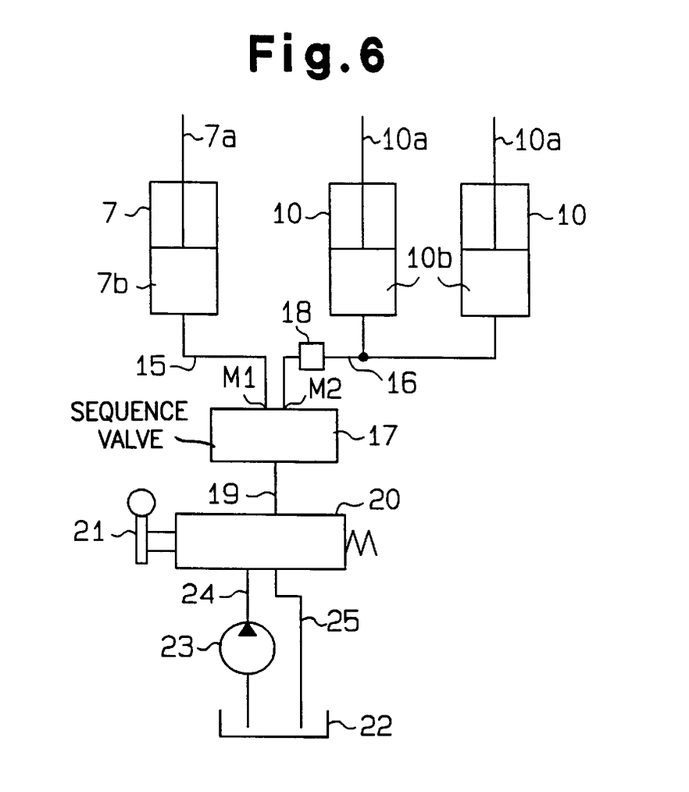
FIG. 6 is a diagrammatic illustrating an oil circuit for supplying oil to the mast assembly of FIG. 3A.

The full free cylinder 7 and the mast cylinders 10 are single-movement types. As illustrated in FIG. 6, the full free cylinder 7 is connected to a first port M1 of the sequence valve 17. The mast cylinders 10 are also connected to the sequence valve 17 by a hose 16. The hose 16 is connected to the bottom chamber 10b of each mast cylinder and to a second port M2 of the sequence valve 17. A flow regulator valve 18 is located in the hose 16. The sequence valve 17 is connected to a control valve 20 by a passage 19. The control valve 20 is switched among three positions, which include positions for lifting the fork 6a, lowering the fork 6a and stopping the movement of the fork 6a. Specifically, the control valve 20 is switched among the three positions in accordance with the position of a lift lever 21 connected to the valve 20. The lever 21 is switched among lifting, lowering and neutral positions. A hydraulic pump 23 is connected to the control valve 20 by a conduit 24. The pump 23 supplies oil from an oil tank 22 to the cylinders 7, 10. The control valve 20 is connected to the oil tank by a conduit 25.

When the lift lever 21 is at the lifting position, the control valve 20 communicates the passage 19 with the conduit 24. When the lift lever 21 at the lowering position, the valve 20 communicates the passage 19 with the conduit 25. When the lever 21 is at the neutral position, the valve 20 disconnects the passage 19 from the conduits 24, 25.

The sequence valve 17 may have the same structure, for example, as the sequence valve disclosed in Japanese Unexamined Patent Publication 8-143292. When receiving oil from the control valve 20, the sequence valve 17 supplies oil to the full free cylinder 7 through the first port M1. When the full free cylinder 7 is maximally extended, the sequence valve 17 is switched to a second position. Accordingly, the valve 17 supplies oil to the mast cylinders 10 through the second port M2, thereby extending the mast cylinders 10.

Figure 5:
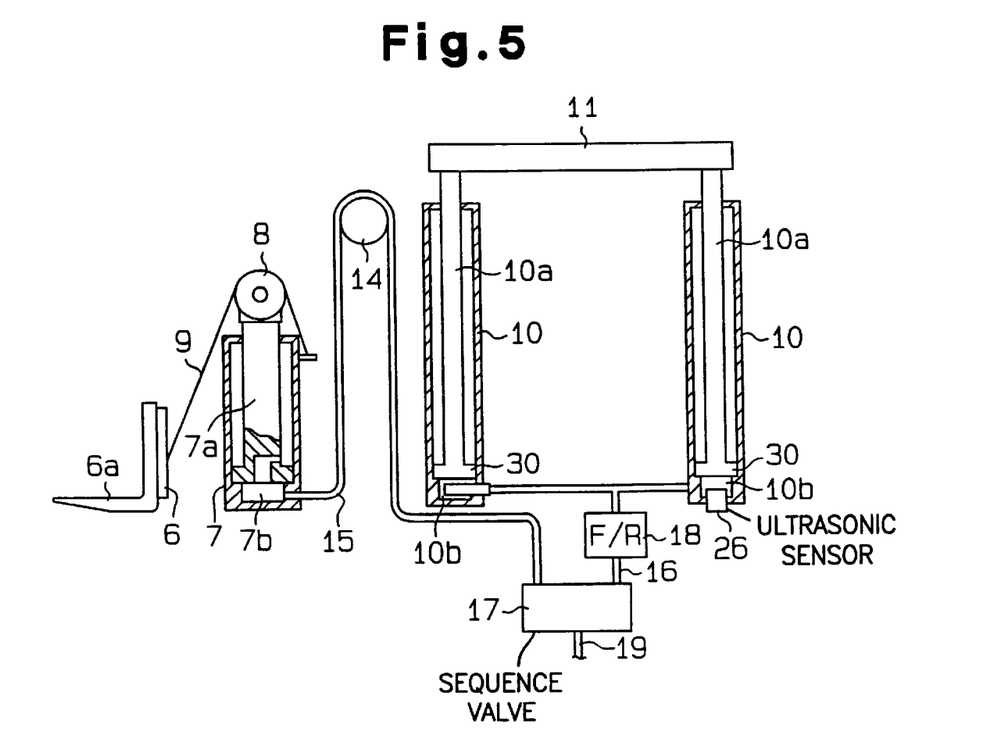
FIG. 5 is a diagrammatic cross-sectional view illustrating the mast assembly of FIG. 3A.

As shown in FIG. 5, an ultrasonic transmitter-receiver (transceiver), or ultrasonic sensor 26, is attached to one of the mast cylinders 10. The structure of the mast cylinder 10 having the ultrasonic sensor 26 will now be described with reference to FIGS. 1 and 2. The mast cylinder 10 has a cylindrical housing 27, a bottom block 28 functioning as a head cover, a rod cover 29, the piston rod 10a and a piston 30 integrally formed with the piston rod 10a. The mast cylinder 10 is arranged such that the bottom block 28 is located at the lower end. The bottom block 28 is welded to the housing 27, and the rod cover 29 is screwed to the housing 27. The piston rod 10a extends through a hole 29a formed in the rod cover 29 and is inserted in the housing 27. A seal 31 is fitted in the hole 29a. Also, an O-ring 32 is fitted between the circumference of the housing 27 and the inner wall of the rod cover 29. A substantially cylindrical stopper 33 is fitted in the upper portion of the housing 27 to limit the extension of the piston rod 10a. The lower end of the stopper defines the top dead center position of the piston 30.

Figure 1:
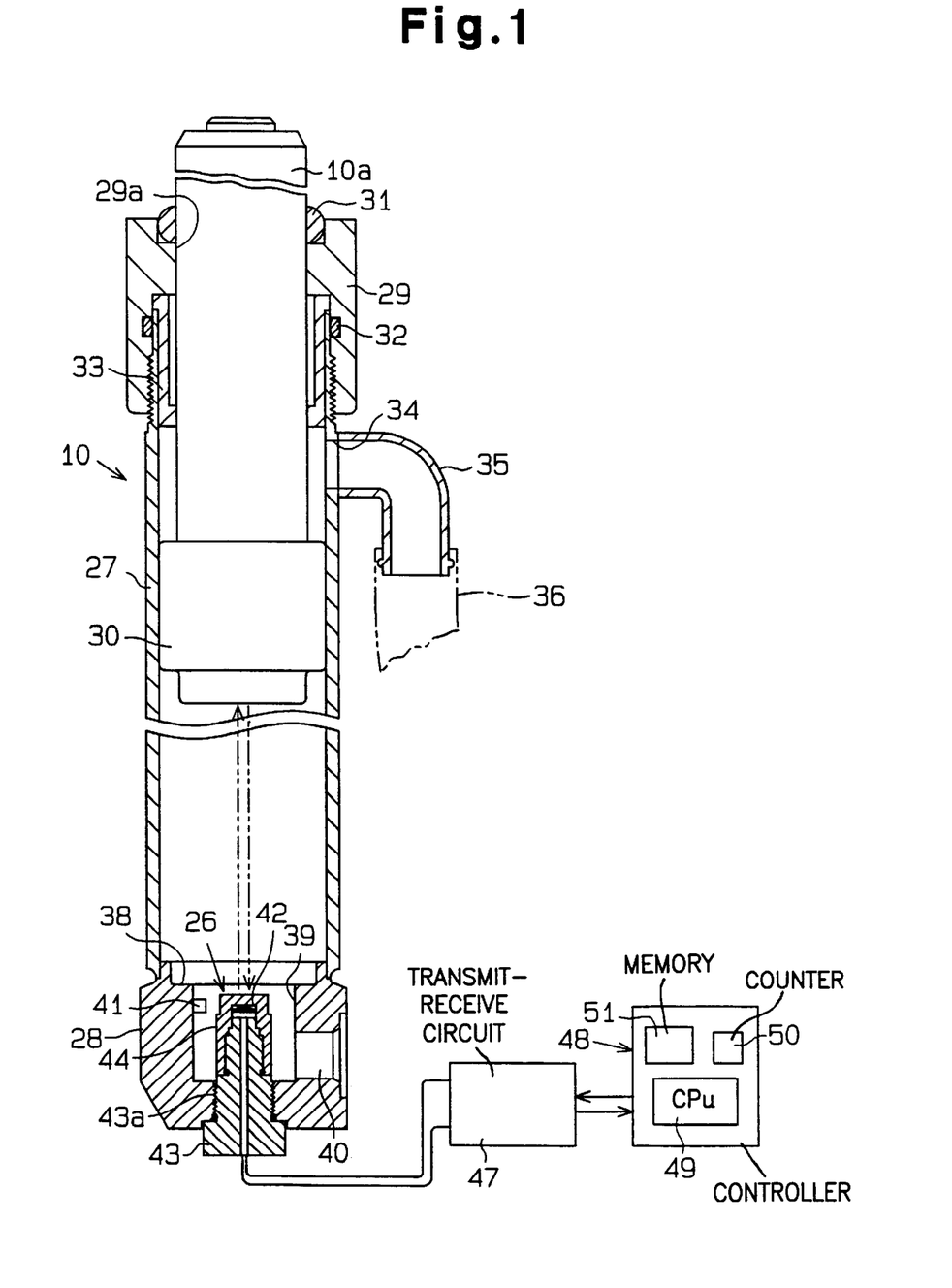
FIG. 1 is a cross-sectional view illustrating a mast cylinder according to one embodiment of the present invention.

The housing 27 has an air outlet 34 in the vicinity of the stopper 33. An overflow pipe 35 is fixed to the outlet 34. When the piston rod 10a is extended, or lifted, air compressed by the piston and leaked oil are sent to the oil tank 22 (see FIG. 6) through the pipe 35 and a hose 36 coupled to the pipe 35.

A stopper surface 38 is formed in the top of the bottom block 28. The stopper surface 38 limits the movement of the piston 30 by contacting the bottom surface of the piston 30. A sensor chamber 39 is defined in the bottom block 28 to accommodate the ultrasonic sensor 26. Also a port 40 is formed in the side wall of the chamber 39. Oil is supplied to and drained from the cylinder 10 through the port 40. In the embodiment of FIGS. 1 to 6, the sensor chamber 39 is the bottom chamber 10b. Temperature detecting means, or a temperature sensor 41, is located in the chamber 39.

Figure 2:
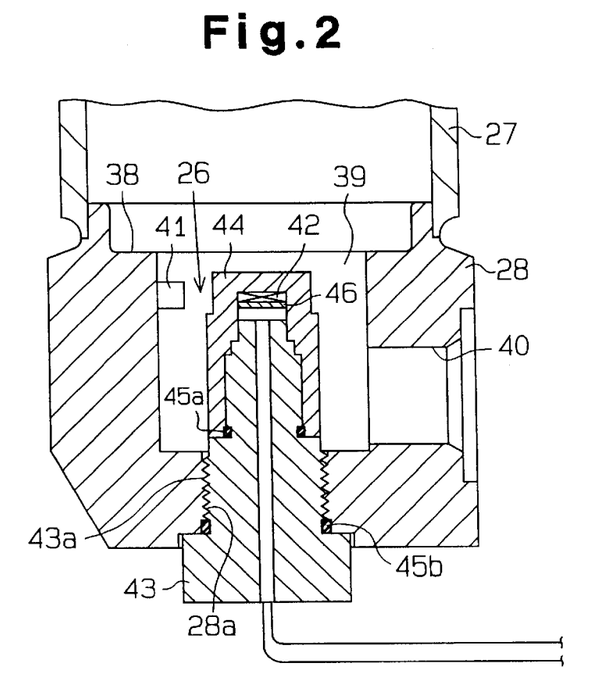
FIG. 2 is an enlarged partial cross-sectional view illustrating the mast cylinder of FIG. 1.

As shown in FIGS. 1 and 2, the ultrasonic sensor 26 is fixed to the bottom block 28 such that its transmitting portion faces the piston 30. The ultrasonic sensor 26 includes an oscillator 42, a case 43 for supporting the oscillator 42 and a cap 44 for covering the oscillator 42. The oscillator 42 is also known as an ultrasonic transducer, which oscillates in accordance with electrical signals. The oscillation produces ultrasonic waves. The oscillator 42 also receives ultrasonic waves reflected by an object, oscillates in response, and thus converts the received ultrasonic waves to electric signals. The oscillator 42 is glued to the cap 44 by an adhesive. The cap 44 is press fitted to the case 43. An O-ring 45a is located between the inner circumference of the cap 44 and the circumference of the case 43. An acoustical material 46 is located beneath the oscillator 42. External threads 43a are formed on the case 43. The case 43 is secured to the bottom block 28 by screwing the case 43 to an internally threaded hole 28a formed in the bottom wall of the bottom block 28. An O-ring 45b is located between the bottom block 28 and the case 43. In this manner, the ultrasonic sensor 26 is incorporated in mast cylinder 10.

The cap 44 may be made of any material. However, the thickness of the cap 44 affects the frequency matching, or the acoustic impedance. Therefore, the thickness of the cap 44 must be determined based on the selected material. When forming the cap 44 with metal, iron and aluminum are preferred because they are easy to machine and possess sufficient strength. In the embodiment of FIGS. 1 to 6, the cap 44 is made of aluminum. The case 43 is also made of metal.

The ultrasonic sensor 26 is electrically connected to a transmit-receive circuit 47. The transmit-receive circuit 47 is electrically connected to a controller 48 and includes an ultrasonic wave generator (not shown). The circuit 47 supplies an ultrasonic wave signal having a certain frequency to the sensor 26 based on signals form the controller 48. The circuit 47 also includes an amplifier and a detector (neither is shown) for amplifying analog signals inputted from the sensor 26 and for converting the analog signals into pulse signals. The circuit 47 then outputs the pulse signals to the controller 48.

The controller 48 includes a central processing unit (CPU) 49, which functions as a judging means, a counter 50, which serves as a time measuring means, and a memory 51. The counter 50 measures the traveling time of ultrasonic waves, or the time from when an ultrasonic signal is output to when a reflected ultrasonic signal is received. The memory 51 stores control programs and data used for computing the position of the fork 6a. Specifically, the memory 51 stores a formula or a map representing the relationship between the temperature of oil and a threshold value (a predetermined time ts) of the traveling time of an ultrasonic wave. The temperature sensor 41 is located in the chamber 39. Therefore, the temperature detected by the sensor 41 is not necessarily equal to the temperature of the oil located in the path of the ultrasonic waves transmitted from the ultrasonic sensor 26. Thus, the relationship between the detected oil temperature and the threshold value ts of the wave traveling time is determined based on tests.

The temperature sensor 41 is electrically connected to the controller 48. The CPU 49 computes the temperature of the oil in the mast cylinder 10 based on the detection signal from the temperature sensor 41. The CPU 49 measures the time t from when an ultrasonic wave is transmitted to when the reflected wave is received and compares the measured time with the threshold value ts. If the measured time t is shorter than the threshold value ts, the CPU 49 judges that the piston 30 is at the lowest position. If the measured time t is greater than the threshold value ts, the CPU 49 judges that the piston 30 is not at the lowest position. The CPU 49 functions as an ON/Off switch for judging whether the piston 30 is at the lowest position.

The operation of the mast assembly 2 will now be described.

When the lift lever 21 is at the neutral position, the passage 19 is disconnected from the conduits 24, 25. Therefore, the passage 19 does not either supply oil to or drain oil from the sequence valve 17, which locks the piston rods 7a and 10a.

When the lift lever 21 is moved to the lift position, the control valve 20 is switched to a supply position for communicating the passage 19 with the conduit 24, which supplies oil discharged from the pump 23 to the sequence valve 17 via the passage 19. The full free cylinder 7 is extended accordingly, which lifts the fork 6a. At this time, the inner masts 5 are not moved relative to the middle masts 4. Oil is supplied only to the full free cylinder 7 until the full free cylinder 7 is maximally extended. If the lift lever 21 is still at the lift position when the full free cylinder 7 is fully extended, the sequence valve 17 supplies oil to the mast cylinders 10 thereby extending the cylinders 10. This lifts the middle masts 4 and the inner masts 5. Accordingly, the fork 6a is lifted further.

On the other hand, when the lift lever 21 is switched to a lowering position, the control valve 20 is switched to a drain position for communicating the passage 19 with the conduit 25. As a result, the force based on the weight of the piston rods 10a, the middle masts 4, the inner masts 5 and the fork 6a exceeds the force due to the pressure of oil acting on the piston 30. In this state, oil enters the sequence valve 17 only through the second port M2 until the piston 30 of each mast cylinder 10 reaches the lowest position. Accordingly, the mast cylinder 10 is contracted, and the middle masts 4 and the inner masts 5 are lowered with the fork 6a.

When the pistons 30 reach the lowest position, the sequence valve opens the first port M1. Oil then enters the sequence valve 17 through the first port M1. This drains oil from the full free cylinder 7 and starts contracting the piston rod 7a. Accordingly, the fork 6a is lowered further along the inner mast 5.

The CPU 49 outputs a command signal for detecting the position of the piston 30 to the transmit-receive circuit 47 at predetermined time intervals. Based on the command signal, the transmit-receive circuit 47 sends an electric signal having a predetermined frequency to the ultrasonic sensor 26. The ultrasonic sensor 26 transmits an ultrasonic wave based on the electric signal. The ultrasonic waves travel through the oil. When an echo reflected from the bottom of the piston 30 reaches the ultrasonic sensor 26, the sensor 26 sends an electric signal corresponding to the received ultrasonic wave to the transmit-receive circuit 47. The transmit-receive circuit 47 amplifies the signal from the sensor 26 and converts the signal to pulse signals. The transmit-receive circuit 47 then outputs the pulse signals to the controller 48.

The speed of sound in oil is approximately 1400 m/sec, and a distance L from the ultrasonic sensor 26 to the bottom of the piston 30 when the piston 30 is at the lowest position is a few centimeters. For example, if the distance L is 2.8 cm, the time period required for an ultrasonic wave to travel to and return from the piston 30 is approximately $20\mu$ sec. The frequency of the ultrasound is optimal when it is between 0.1 to 5 MHz based on the type of oil and the type of the sensor 26.

The CPU 49 uses the counter 50 to measure time from when the CPU 49 sends the command signal to the transmit-receive circuit 47. The CPU 49 stops the measurement of time when receiving a pulse signal from the transmit-receive circuit 47. The counter 50 receives a clock signal from a clock oscillator (not shown) through a gate, which only opens from when the CPU 49 outputs the command signal until when the CPU 49 receives the pulse signal. The CPU 49 computes the time t from the transmission of the ultrasonic waves to the reception of the reflected waves based on the count value of the counter 50. Then, the CPU 49 compares the time t with the threshold value ts. If the time t is smaller than the threshold value ts, the CPU 49 judges that the piston 30 is at the lowest position. If the time t is greater than the value ts, the CPU 49 judges that the piston 30 is not at the lowest position.

Whether the piston 30 is at the lowest position is used for controlling the pivoting of the rear axle and the tilting speed of the mast assembly 2. That is, if the piston 30 is not at the lowest position, the full free cylinder 7 is maximally extended. The fork 6a is at least as high as a position corresponding to the maximum length of the full free cylinder 7. Therefore, in a forklift that locks the rear axle when the fork 6a is higher than the position corresponding to the maximum length of the cylinder 7, whether the piston 30 is at the lowest position is used for determining whether to lock the rear axle. Likewise, whether the piston 30 is at the lowest position is used for determining whether to decrease the tilting speed of the mast assembly 2.

Ultrasonic waves generated by the oscillator 42 travel not only toward the piston 30 but also in the opposite direction. Waves reflected from a wall, such as the inner wall of the block 28, act as noise and deteriorate the accuracy of the position detection of the piston 30. However, the ultrasonic waves directed toward the bottom of the oscillator 42 are absorbed by the acoustical material 46, which is located beneath the oscillator 42. This eliminates noise in the signals sent from the sensor 26 to the transmit-receive circuit 47 thereby improving the detection accuracy.

If the ultrasonic sensor 26 were used for continuously detecting the position of the piston 30 in relation to the lowest position of the piston 30, it would be necessary to reduce noise and attenuation of ultrasonic waves. However, in the present invention, the sensor 26 only detects whether the piston 30 is at the lowest position. The attenuation and the noise of the ultrasonic waves therefore do not hinder the function of the sensor 26.

Suppose the ultrasonic sensor 26 is located outside of the mast cylinder 10 and a reflection member were attached to the piston rod 10a to move integrally with the rod 10a. In this case, the sensor 26 transmits ultrasonic waves to the reflection member, which is lifted and lowered together with the piston rod 10a, thereby detecting the position of the piston 10a based on ultrasonic waves reflected by the reflection member. However, this construction would allow foreign ultrasonic waves to reach the sensor 26. Also, foreign objects can block ultrasonic waves between the sensor 26 and the reflection member, which may result in erroneous detection by the sensor 26 or may prevent the sensor 26 from functioning normally. However, in the present invention, the ultrasonic sensor 26 is located in the mast cylinder 10. Therefore, the present invention avoids the problems associated with locating the sensor 26 outside of the mast cylinder 10.

Further, since the ultrasonic sensor 26 is located in the mast cylinder 10, the sensor 26 is not exposed to outside air. Therefore, even if the forklift is used in a harsh environment such as in a place near the sea or where brine exists, the sensor 26 is not adversely affected.

Accordingly, the illustrated embodiment has the following advantages.

(1) Whether the piston 30 is at the lowest position is detected based on signals output from the ultrasonic sensor 26 located in the mast cylinder 10. Therefore, unlike the prior art structure in which a sensor is located outside of a cylinder, the illustrated embodiment prevents the sensor 26 from being damaged by foreign objects. The illustrated embodiment also protects the sensor 26 from the environment. The sensor 26 accurately detects the position of the piston 30 even if the forklift is used in a harsh environment. The construction further prevents the sensor 26 from being affected by environmental noises.

(2) Whether the piston 30 is at the lowest position is detected based on the signals output from the ultrasonic sensor 26. Therefore, the time t during which an ultrasonic wave leaves the sensor 26 and returns to the sensor 26 needs to be accurately measured only when the piston 30 is relatively close to the sensor 26. Thus, the detection of the sensor 26 is scarcely affected by attenuation and noise in ultrasonic waves.

(3) The CPU 49 detects the temperature of oil and adjusts the threshold value ts based on the detected temperature. The CPU 49 therefore accurately detects whether the piston 30 is at the lowest position.

(4) Whether the full free cylinder 7 is maximally extended is judged based on whether the piston 30 is at the lowest position. In comparison to a structure in which a sensor is located in the vicinity of the full free cylinder 7, wires for connecting the sensor 26 with the controller 48 are short in the embodiment of FIGS. 1 to 6. In particular, the mast assembly 2 is a full free type triplex mast, which has the inner masts 5, the middle masts 4 and the outer masts 3. Therefore, if a sensor for detecting the maximum extension of the full free cylinder 7 were attached to the cylinder 7, wires for connecting the sensor with the controller 48 would be extremely long. Thus, the embodiment of FIGS. 1 to 6 is very advantageous.

(5) The temperature sensor 41 is located in the chamber 39. Therefore, there is no need for forming a space or a chamber for accommodating the sensor 41.

(6) The acoustical material 46 is located beneath the oscillator 42. This reduces the noise in the signals output from the ultrasonic sensor 26 to the transmit-receive circuit 47.

(7) The bottom surface of the piston 30 reflects ultrasonic waves. Therefore, the piston 30 does not require a separate reflection member.

It should be apparent to those skilled in the art that the present invention may be embodied in many other specific forms without departing from the spirit or scope of the invention. Particularly, it should be understood that the invention may be embodied in the following forms.

Figure 7:
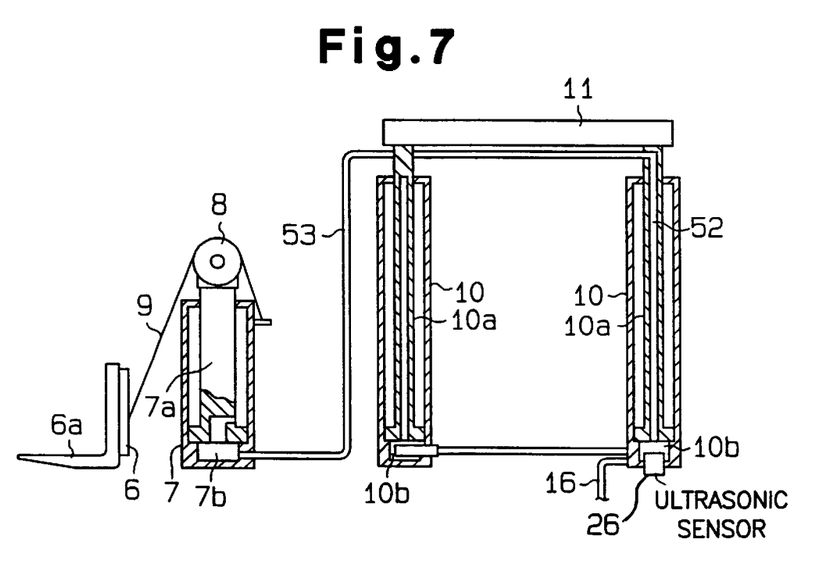
FIG. 7 is a diagrammatic cross-sectional view illustrating a mast assembly according to another embodiment.

FIG. 7 shows a mast assembly according to another embodiment. In the embodiment of FIG. 7, the full free type triplex mast assembly 2 of FIGS. 1 to 6 is replaced with a double mast assembly 2 having no middle masts 4. The upper beam 11 is coupled to the inner masts 5. The mast assembly of FIG. 7 has no hose 15 connected to the sequence valve 17 for supplying oil to the full free cylinder 7. Instead, a passage 52 is formed in the piston rod 10a of a mast cylinder 10a. The passage 52 is connected to the full free cylinder 7 by a hose 53. Further, the mast assembly of FIG. 7 has no sequence valve 17. Instead, the ratio of the pressure receiving area of the piston in the full free cylinder 7 to that of the piston 30 in the mast cylinder 10 is determined such that the mast cylinders 10 start extending after the full free cylinder 7 is maximally extended. The mast assembly of FIG. 7 has a simpler construction than the mast assembly 2 of FIGS. 1 to 6.

The sequence valve 17 may be employed in the mast assembly of FIG. 7. In this case, the sequence valve 17 functions such that the mast cylinders 10 are extended after the full free cylinder 7 is maximally extended.

Figure 8:
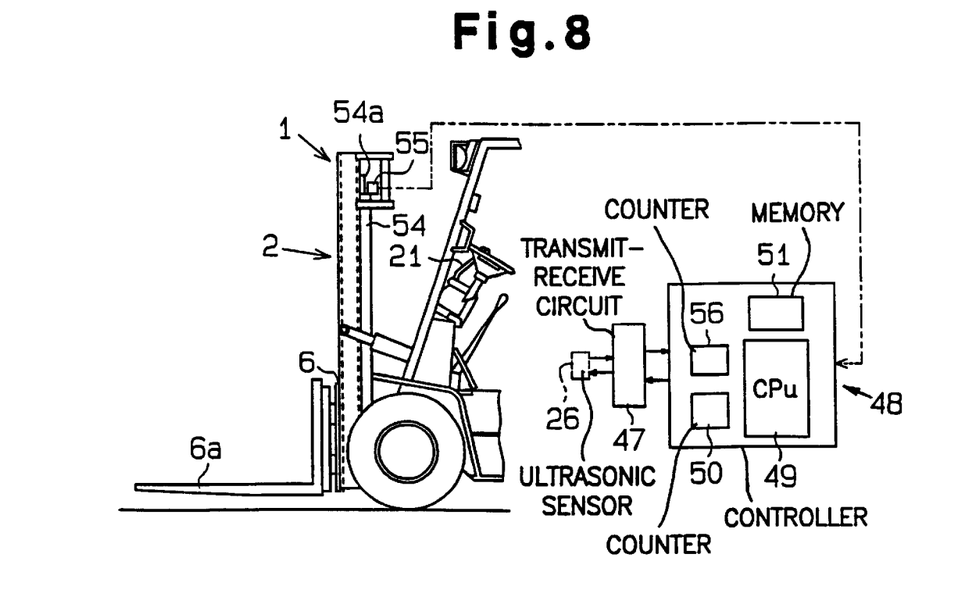
FIG. 8 is a partial side view of a forklift having a mast assembly according to another embodiment.

The present invention may be employed in a forklift having an ordinary mast assembly. That is, the present invention may be used in a mast assembly in which the fork 6a is integrally lowered and lifted with inner masts. FIG. 8 shows a forklift having such a mast assembly. The forklift of FIG. 8 has lift cylinders 54 and a sensor 55 located at an upper portion of one of the lift cylinders 54. The piston rod 54a of the lift cylinder 54 with the sensor 55 includes detection parts. The detection parts are located at predetermined intervals (for example, one centimeter) on the piston rod 54a. The lift cylinder 54 includes the ultrasonic sensor 26 shown in FIG. 1. The sensor 55 is connected to a counter 56 located in the controller 48. The sensor 55 outputs an ON signal every time it detects each detection part. The CPU 49 is electrically connected to the sensor 55 and to the lift lever position sensor (not shown). The CPU 49 counts the number of ON signals output from the sensor 55. When the lift lever 21 is at the lift position, the CPU 49 adds one to the counter value of the counter 56 on receiving an ON signal from the sensor 55. When the lift lever 21 is at the lowering position, the CPU subtracts one from the counter value of the counter 56 on receiving an ON signal from the sensor 55. The current height of the fork 6a from the lowest position is computed by multiplying the counter value of the counter 56 by a predetermined coefficient. In the forklift 1 of FIG. 8, the coefficient is equal to the interval between adjacent detection members multiplied by two. The sensor 55 and the counter 56 function as a fork height sensor. When the CPU 49 judges that the piston 30 is at the lowest position, the CPU 49 resets the counter 56. In this case, the lowest position of the piston 30, which is referential position of the fork 6a, is accurately detected. The position of the fork 6a can be accurately detected by simply locating the fork 6a at the lowest position when starting the forklift.

Figure 9:
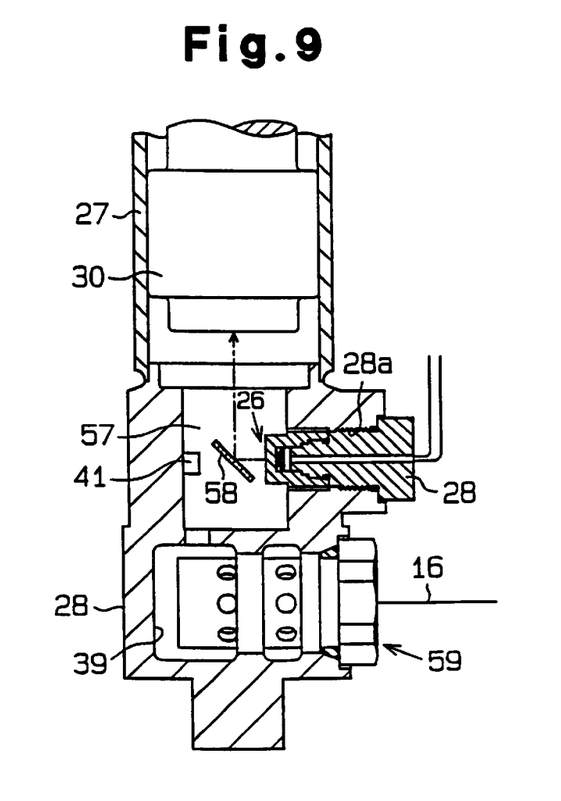
FIG. 9 is a partial cross-sectional view illustrating a mast cylinder according to another embodiment having an ultrasonic sensor.

In the mast assembly of FIGS. 1 to 8, the ultrasonic sensor 26 is arranged such that its axis is aligned with the moving direction of the piston 30. However, the sensor 26 may be arranged transversely relative to the moving direction of the piston 30. FIG. 9 shows an example of such arrangement of the sensor 26. The bottom block 28 of FIG. 9 has chambers 39, 57, which are connected with each other. A sensor hole 28a is formed in the side wall of the upper chamber 57. The ultrasonic sensor 26 is screwed to the sensor hole 28a. The sensor 26 is fixed to the bottom block 28 to transmit ultrasonic waves in a direction perpendicular to the axis of the mast cylinder 10. The temperature sensor 41 and a reflection plate 58 are located in the chamber 57. The reflection plate 58 reflects ultrasonic waves from the sensor 26 to the piston 30 and also reflects ultrasonic waves reflected by the piston 30 to the sensor 26. The reflection plate 58 is located in the center of the chamber 57 and the reflection surface of the plate 58 is inclined by forty-five degrees. The reflection plate 58 is made, for example, with metal. A flow regulator valve 59 is located in the chamber 39, which is below the chamber 57. The hose 16 is connected to the valve 59.

In the embodiment of FIG. 9, ultrasonic waves transmitted from the ultrasonic sensor 26 are reflected by the reflection plate 58, which changes the advancing direction of the waves by ninety degrees. The waves are then reflected by the piston 30. The reflected waves are again reflected by the reflection plate 58 and received by the sensor 26. Therefore, the embodiment of FIG. 9 has the advantages (1) to (7) like the embodiments of FIGS. 1 to 8. Disassembling the sensor 26 of FIG. 2, which is located at the bottom of the bottom block 28, is difficult without disassembling the mast cylinder 10 from the forklift 1, which makes maintenance of the sensor 26 troublesome. The structure of FIG. 9, in which the sensor 26 is fixed to the side of the mast cylinder 10, facilitates the disassembly of the sensor 26 for maintenance of the sensor 26.

The temperature sensor 41 may be located in a place other than in the chambers 39, 57. For example, the sensor 41 may be located in the cylinder housing 27 or in the hose 16.

The mast cylinders 10 may be multi-movement cylinders.

The number of the mast cylinders 10 is not limited to two. For example, there may be only one mast cylinder 10.

The ultrasonic sensor 26 of the illustrated embodiments is a single device that both transmits and receives ultrasonic waves. However, the sensor 26 may be replaced with an ultrasonic sensor having a device for transmitting ultrasonic waves and a separate device for receiving ultrasonic waves.

A lamp 100 (FIG. 3A) that is lit when the CPU 49 judges that the piston 30 is at the lowest position may be provided in the forklift 1. The lamp 100 is located in the vicinity of the operator's seat so that the operator can easily see the lamp 100. The lamp 100 notifies the operator that the full free cylinder 7 is maximally extended.

The manually operated control valve 20 may be replaced with an electromagnetic control valve. Using an electromagnetic control valve has the following advantage. For example, when the forklift 1 carries loads between a warehouse and the outside, the height of the fork 6a is limited by the size of the entrance of the warehouse. Thus, the forklift 1 is preferably moved with the fork 6a held at a position that corresponds to the maximum length of the full free cylinder 7 such that the fork 6a does not contact the entrance. If the CPU 49 judges that the piston 30 is not at the lowest position while the fork 6a is lifted from the lowest position, the CPU 49 switches the electromagnetic control valve to a neutral position to stop lifting of the fork 6a. This automatically holds the fork 6a at the position that corresponds to the maximum length of the full free cylinder 7 when the fork 6a lifts a load. Accordingly, the operator can start moving the forklift 1 immediately thereafter.

The present invention may be applied to other types of industrial vehicles, such as a vehicle for high lift work having a hydraulically controlled platform, or a back-hoe having a hydraulic shovel. In these cases, the ultrasonic sensor 26 is located in the hydraulic cylinder. The vehicle may have judging means for judging whether the piston of the cylinder is at the lowest position based on signals from the sensor 26. Since the sensor does not contact the piston, it cannot be damaged. Further, the sensor is not affected by the environment.

The present examples and embodiments are to be considered as illustrative and not restrictive and the invention is not to be limited to the details given herein, but may be modified within the scope and equivalence of the appended claims.

What is claimed is:

1. A lift cylinder comprising:

a cylinder body, the cylinder body being occupied by oil;

a piston that is moved axially in the cylinder body by oil pressure within a limited range of movement;

a transducer device located near one end of the cylinder body out of the range of movement of the piston, wherein, in response to an electric signal, the transducer device transmits an ultrasonic signal toward a reflective surface that moves integrally with the piston, and the transducer device receives an ultrasonic signal reflected from the reflective surface and produces an electric signal corresponding to the received ultrasonic signal;

a temperature sensor located in the cylinder body to detect the temperature of the oil; and a controller for judging whether the piston is fully retracted, wherein the controller derives a current threshold value from the currently detected oil temperature based on a predetermined relationship between oil temperatures and threshold values, and wherein the controller produces a measured value that represents the time period from when an ultrasonic signal is sent to when a reflection of the ultrasonic signal is received by the transducer device and wherein the controller compares the current threshold value to the measured value to determine whether the piston is fully retracted.

2. A lift cylinder according to claim 1, wherein the transducer device is oriented such that ultrasonic signals are emitted in the axial direction of the cylinder body.

3. A lift cylinder according to claim 1, wherein a reflector device is located at one end of the cylinder body to reflect ultrasonic signals traveling between the transducer device and the reflective surface.

4. A lift cylinder according to claim 1, wherein the transducer device includes a transceiver that performs both transmission and reception of ultrasonic signals.

5. A lift cylinder according to claim 1, wherein the lift cylinder is generally vertical and forms part of a lifting apparatus, wherein the lifting apparatus includes a mast and a lifting implement, and the lift cylinder raises and lowers the mast, which raises and lowers the lifting implement.

6. The lift cylinder according to claim 5, wherein the lift cylinder is a first lift cylinder, and the lifting apparatus includes a second lift cylinder for raising and lowering the lifting implement with respect to the mast, the second lift cylinder being supported by the mast, wherein the first lift cylinder raises the mast after the second lift cylinder is fully extended, and the second lift cylinder lowers the lifting implement after the first lift cylinder is fully retracted, and wherein the controller determines that the second lift cylinder is fully extended if it determines that the first lift cylinder is not fully retracted.

7. A lift cylinder according to claim 6, wherein the lifting apparatus includes an indicator for indicating to an operator of the lifting apparatus that the second lift cylinder is fully extended.

8. A lift cylinder according to claim 5, wherein the lifting apparatus includes a height sensor for detecting the height of the mast, wherein the height sensor includes a counter for counting signals that are produced at intervals of distance moved by the mast, and wherein the counter is reset when the controller determines that the lift cylinder is fully retracted.

* * * * *